United States Patent [19]

Suzuki

[11] 4,392,408
[45] Jul. 12, 1983

[54] RECORDER TRAINING DEVICE

[76] Inventor: Manji Suzuki, 443, Ryoke-machi, Hamamatsu-shi, Shizuoka-ken, Japan

[21] Appl. No.: 276,823

[22] Filed: Jun. 24, 1981

[30] Foreign Application Priority Data

Jul. 1, 1980 [JP] Japan ................................ 55-89630

[51] Int. Cl.³ ............................................. G10D 7/00
[52] U.S. Cl. ................................ 84/380 C; 84/464 R; 200/DIG. 2
[58] Field of Search ............. 84/380 C, 464 R, 464 A, 84/477 R, 485 R; 200/DIG. 1, DIG. 2

[56] References Cited

U.S. PATENT DOCUMENTS 2,473,199 6/1949 Garcia ..................................... 84/464

Primary Examiner—Russell E. Adams
Attorney, Agent, or Firm—Holman & Stern

[57] ABSTRACT

A recorder training device comprising a recorder body having a plurality of tone holes provided with a couple of electrodes opposingly disposed around them such that the electrodes may be indicated by electric lights on the corresponding tone hole figures of a recorder pattern shown on an indicator plate, or on the electric lights on the musical scales of a music score pattern indicated on an indicator plate.

3 Claims, 6 Drawing Figures

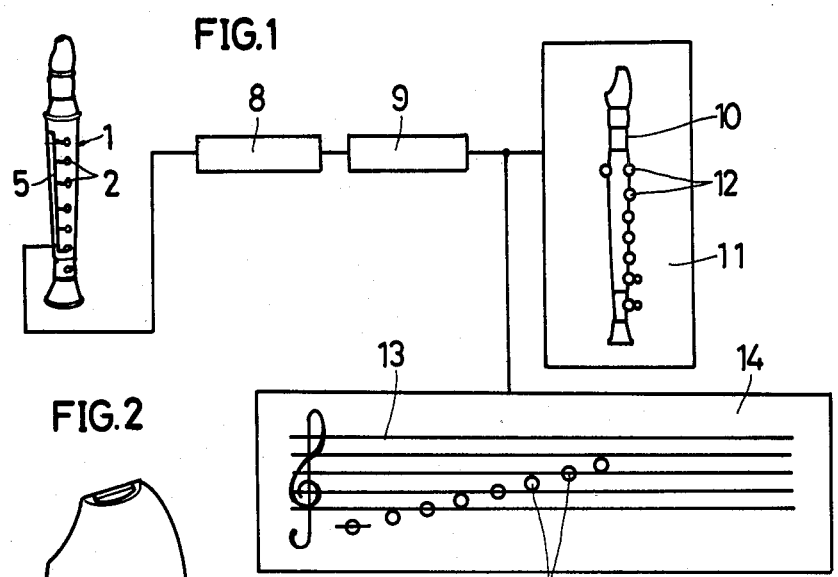
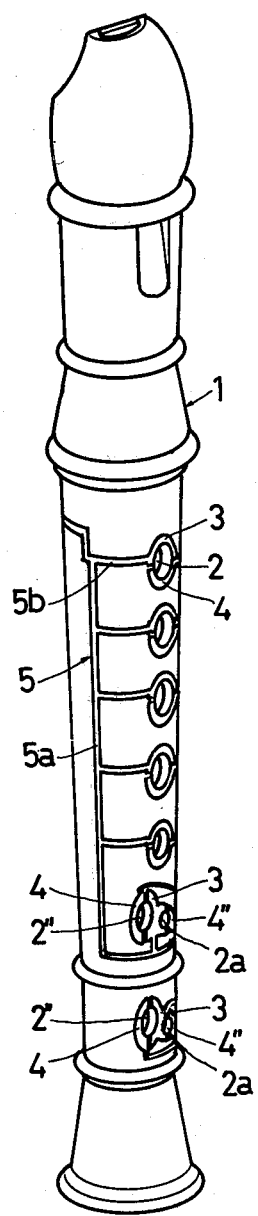
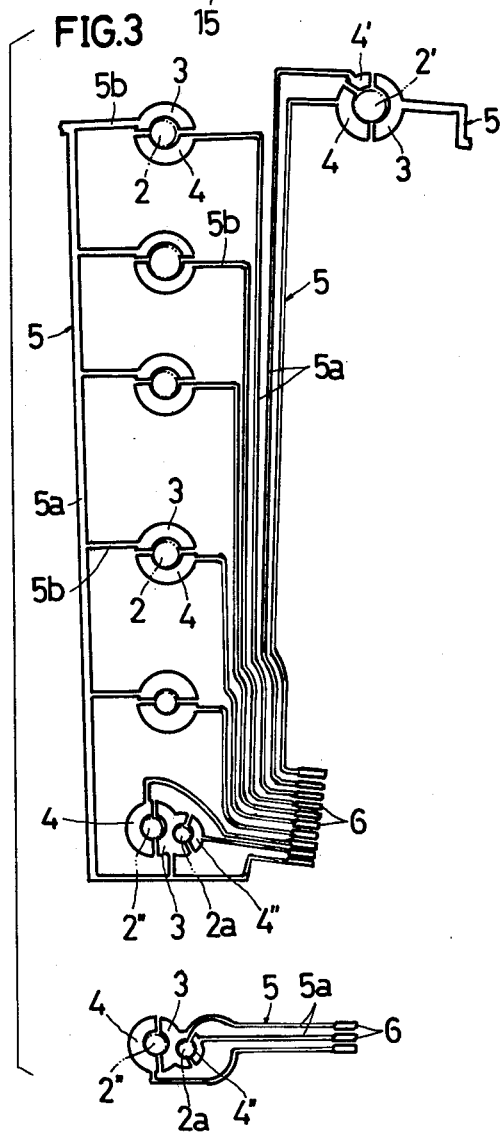

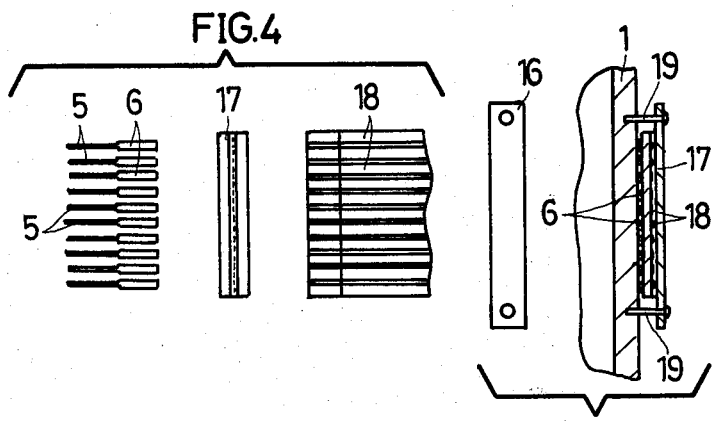
FIG.4
FIG.5
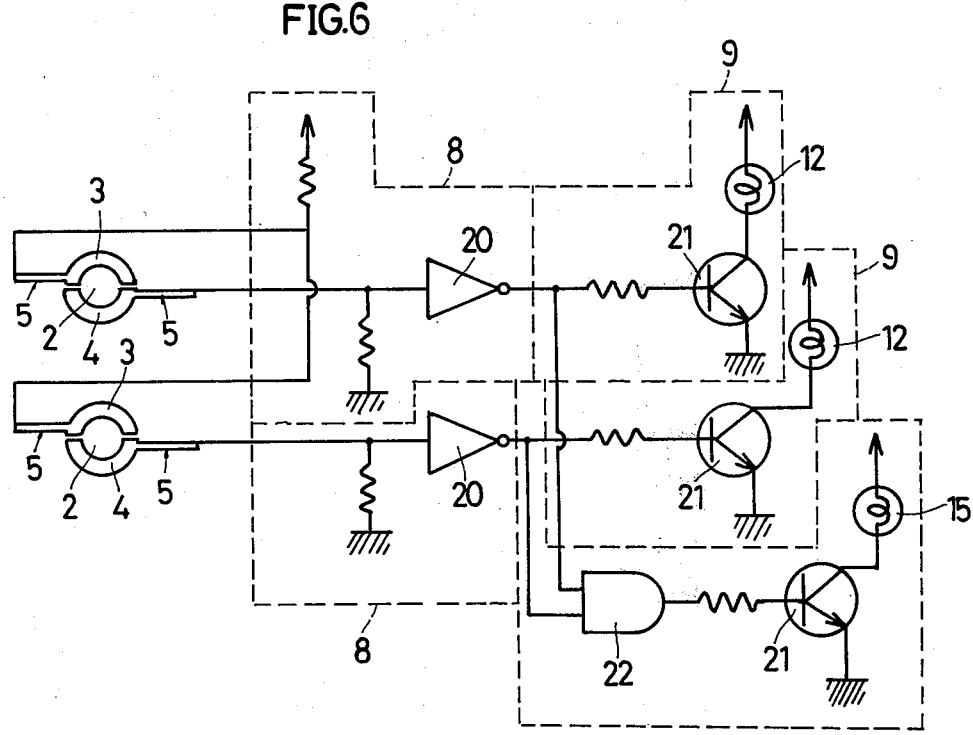
FIG.6

4,392,408

RECORDER TRAINING DEVICE

BRIEF DESCRIPTION OF THE INVENTION

This invention relates to a recorder training device comprising a recorder body having a plurality of tone holes provided with a couple of electrodes opposingly disposed around each of the holes in such a manner that the electrodes may be indicated by means of electric lights at the corresponding tone hole patterns on an indicator plate showing a recorder figure.

DETAILED DESCRIPTION OF THE INVENTION

The present invention relates to a recorder training device for clearly teaching the operation or performance of a recorder to those desiring to play a recorder and, in particular, to school children or pupils.

Conventional methods of training for playing a recorder have been performed only with a recorder and a musical score.

The present invention has, however, remarkably changed such conventional methods and aims at providing a device capable of exactly training oneself in playing a recorder by utilizing electric lights.

In order to attain the object of the present invention, the recorder of the present invention comprises a plurality of tone holes each of which is provided with a couple of electrodes opposingly disposed around the hole, such electrodes being designed to be operable by fingers in such a way that they may be indicated by means of an electric light on the corresponding tone hole pattern on an indicator plate showing a recorder figure.

BRIEF DESCRIPTION OF THE DRAWING

The invention will be described in more detail hereinafter with reference to the accompanying drawing showing one preferred embodiment of a recorder training device according to this invention, wherein;

FIG. 1 is a block schematic diagram of the system of this invention;

FIG. 2 is a perspective view of a recorder to be used for the device of this invention;

FIG. 3 is an expanded front view of a wiring section to be mounted on the recorder;

FIG. 4 is an expanded front view of a terminal protection portion;

FIG. 5 is a side view in longitudinal section of an assembly according to this invention; and FIG. 6 is a wiring diagram.

In the drawing, reference numeral 1 is a recorder body having a plurality of tone holes 2, 2 around which are opposingly disposed a couple of electrodes 3 and 4 each to be operable by a finger for energization.

The electrodes of each of the tone holes 2 may communicate with a row of terminals 6 through an electric conductor 5 formed on the recorder body 1 by means of plating, attaching or the like.

Each of the terminals 6 is connected via a conductor 7 with electric lights 12 disposed on the tone hole row of a recorder FIG. 10 shown on an indicator plate 11, or with electric lights 15 on each of the musical scale of the music score pattern 13 of an indicator plate 14 through a detection circuit 8 and an indication circuit 9.

The electric conductor 5 is composed of a main conductor member 5b from each of the electrodes 3, 4.

16 is a metal fitting to be fixed to the recorder body 1 by screws 19 to fasten an interconnector 17 and a flat cable 18, both placed on the row of terminals 6.

20 is an inverter of the detection circuit 8; 21 is a transistor included in the indication circuit 9; and 22 is an AND gate.

The tone hole 2' positioned on the rear side of the top tone hole 2 is provided with an electrode 4' beside the electrode 4 in opposition to the electrode 3, and the lower tone hole 2" on the front side of the recorder body is provided with a smaller diameter tone hole 2a around which are arranged electrodes 4" and 3 so that the operation of the electrodes can clearly be indicated on the electric lights by sophisticatedly touching and-/or detaching the fingers on the electrodes.

According to the invention, when each of the tone holes is pushed to keep the electrodes 3, 4 energized via fingers the electric current may not flow, and when the fingers are detached the electric lights 12 or 15 of the indicator plates 11 or 14 may be lighted. Thus, it may be possible for a player of the recorder to exactly learn which of the tone holes has been pushed and therefore the training effect will rapidly and easily be promoted.

I claim:

1. A musical recorder training device comprising:
   a recorder body having a plurality of tone-controlling openings;
   a plurality of electrode pairs, the electrodes of each electrode pair being disposed on opposite sides of a respective tone-controlling opening such that closure of a tone-controlling opening with a finger tip provides an electric current path between a respective electrode pair through that finger tip, the electrodes in each pair being positively fixed relative to one another;
   a plurality of terminals, at least one terminal being provided for each electrode pair and at least one additional terminal;
   a plurality of metal conductors secured substantially along their entire lengths to said recorder body, each conductor extending between a respective terminal and one electrode in a respective electrode pair;
   a further metal conductor secured substantially along its entire length to said recorder body, said further conductor extending between said additional terminal and the other electrodes of said electrode pairs;
   a plurality of electric lamps; and
   circuit means connecting each of said electric lamps to a respective terminal of said plurality of terminals for selectively energizing each lamp as a function of the open and closed condition of each tone-controlling opening, respectively;
   wherein said tone-controlling openings are circular holes and wherein each electrode extends arcuately and substantially concentrically about a portion of respective tone-controlling openings.

2. The device according to claim 1 further comprising:
   an additional tone-controlling opening defined in said recorder body;
   three additional electrodes disposed in spaced circumferential relation about said additional tone-controlling opening;
   two further terminals;
   two additional metal conductors secured substantially along their entire lengths to said body, each extending between a respective one of said three additional electrodes and a respective one of said two further terminals;

wherein said further metal conductor extends into contact with the one of said additional electrodes which is not connected to one of said two additional metal conductors; and wherein said circuit means includes means connecting each of said two further terminals to respective electric lamps.

3. The device according to claim 1 further comprising:

first and second closely spaced additional tone-controlling openings defined in said recorder body;

a first additional electrode disposed partially about said first opening;

a second additional electrode disposed partially about said first opening and partially about said second opening and spaced from said first additional electrode;

a third additional electrode, spaced from said first and second additional electrodes, disposed partially about said second opening;

two further terminals;

two additional metal conductors secured substantially along their entire lengths to said body, each extending between a respective one of said first and third electrodes and a respective one of said two further terminals;

wherein said further metal conductor extends into contact with said second additional electrode; and wherein said circuit means includes means connecting each of said two further terminals to respective electric lamps.

* * * * *